(12) United States Patent
Wilson

(10) Patent No.: US 7,338,604 B2
(45) Date of Patent: Mar. 4, 2008

(54) PROCESS FOR RECYCLING PAINT FLUSH SOLUTION

(75) Inventor: Neil R. Wilson, Lake Orion, MI (US)

(73) Assignee: Henkel Kommanditgesellschaft auf Aktien, Düsseldorf (DE)

( * ) Notice: Subject to any disclaimer, the term of this patent is extended or adjusted under 35 U.S.C. 154(b) by 424 days.

(21) Appl. No.: 10/285,632

(22) Filed: Nov. 1, 2002

(65) Prior Publication Data

US 2004/0084373 A1    May 6, 2004

(51) Int. Cl.
*C02F 1/52* (2006.01)
(52) U.S. Cl. .................... 210/702; 118/603; 134/10; 134/13; 210/709; 210/712; 210/723; 210/724; 210/735; 210/805; 210/806
(58) Field of Classification Search .............. 210/149, 210/167, 257.1, 257.2, 259, 321.6, 639, 651, 210/702–704, 709, 712, 713, 723–736, 749, 210/767, 787, 805, 806; 118/600, 602, 610, 118/603; 427/345, 421, 427; 134/10, 13
See application file for complete search history.

(56) References Cited

U.S. PATENT DOCUMENTS

| | | | | |
|---|---|---|---|---|
| 3,990,869 A | * | 11/1976 | Forney | .................. 95/196 |
| 3,990,986 A | * | 11/1976 | Gabel et al. | ................. 252/181 |
| 4,440,647 A | * | 4/1984 | Puchalski | .................. 210/712 |
| 4,629,572 A | * | 12/1986 | Leitz et al. | .................. 210/714 |
| 4,656,059 A | * | 4/1987 | Mizuno et al. | ............. 427/345 |
| 4,686,047 A | * | 8/1987 | Arots | ........................ 210/712 |
| 4,853,132 A | * | 8/1989 | Merrell et al. | .............. 210/712 |
| 5,240,509 A | * | 8/1993 | Rey et al. | ...................... 134/38 |
| 5,330,658 A | | 7/1994 | Grant et al. | |
| 5,453,301 A | * | 9/1995 | Saatweber et al. | .......... 427/421 |
| 5,547,587 A | | 8/1996 | Molz et al. | |
| 5,632,822 A | | 5/1997 | Knipe et al. | |
| 5,701,922 A | | 12/1997 | Knipe et al. | |
| 5,836,321 A | | 11/1998 | Kaneski et al. | |
| 5,854,190 A | | 12/1998 | Knipe et al. | |
| 6,114,415 A | | 9/2000 | Bertelo et al. | |
| 6,627,086 B2 | * | 9/2003 | Mahoney et al. | ........... 210/725 |

* cited by examiner

*Primary Examiner*—Joseph Drodge
(74) *Attorney, Agent, or Firm*—Connolly Bove Lodge & Hutz LLP

(57) ABSTRACT

A process for removing solids from a water-based flush solution, The process includes: providing dirty flush solution; directing the dirty flush solution to a treatment vessel; adding one or more chemicals to the treatment vessel to form a treated flush solution; separating aggregated paint compounds from the treated flush solution to form a filtered flush solution; and directing the filtered flush solution to spray application equipment. The flush system of the invention includes a treatment vessel, wherein the dirty flush solution is mixed with one or more chemicals to form a treated flush solution; a primary separation unit to remove particles including aggregated paint compounds from the treated flush solution to form a filtered flush solution; and transfer lines to direct the filtered flush solution to spray application equipment. The filtered flush solution contains: 1% to 5% by weight of a water soluble organic solvent; 0.08% to 2% by weight of an alkaline agent selected from an amine or an alkanolamine; 0.2% to 1.5% by weight of polypropylene glycol; 0.3% to 2.5% by weight of alkoxyethanol; and water.

17 Claims, 2 Drawing Sheets

PROCESS FOR RECYCLING PAINT FLUSH SOLUTION

FIELD OF THE INVENTION

This invention is directed to a process for recycling flush solution used to remove residual coatings, particularly, water-based paint from coating application equipment.

BACKGROUND OF THE INVENTION

Automotive assembly paint shops typically use two cleaning steps to remove residual, semi-dried paint from paint application equipment. The first cleaning step is referred to as a purge cycle. During a purge cycle paint is removed from color tree valves by circulating a flush solution through the paint delivery hose to the tip of the paint application device. The second cleaning step is referred to as a cap wash cycle. During a cap wash cycle flush solution is used to remove paint from the outside of paint application spray caps, bells or any similar component, that is used to atomize paint. The flush solutions used in the purge and cap wash cycles are collected and then concentrated in some manner to reduce the volume of waste generated in the process. However, most plants, particularly automotive plants, do not have an economical and efficient process to handle the large volumes of used flush solution and the corresponding waste that is generated.

Water-based flushing solutions generally contain water, alkaline agents and blends of organic water-soluble solvents. Used flushing solutions also contain paint particles and organic compounds, e.g., polymeric resins, present in the paints. As a result, the used flush solutions cannot be discarded without some environmental containment or treatment of the organic containing waste.

U.S. Pat. No. 5,836,321 describes a process of recycling a flush solution solvent used to purge a paint supply line of a paint sprayer. The process includes collection of the water-based flush solution and paint into a collection tank. The collected solution is then directed to a working tank that is connected to an ultrafiltration unit. The ultrafiltration unit concentrates used flush solution by providing for the passage of water and water-based solvents through a membrane, while restricting the passage of pigments and resin components (organics). The resin components generally have a molecular weight from 1000 to 5000. The process is stated to recover from 50% to 65% of the water and solvents from the used flush solution. The separated water and solvents are pumped to a stabilization tank, and then back to a purge solution supply tank. The process also describes the addition of fresh flush solution to make up for the volume of flush solution not recovered in the process. The solids that remain following separation of the water are collected as a heavy slurry or sludge that is pumped out into a sludge tank for subsequent disposal.

Although the above described process begins to address the problem of managing the waste generated in large automotive coating plants, the process has many drawbacks. The process provides poor recovery rates due to a slow permeation rate through the ultrafiltration membrane, and requires relatively expensive separation equipment and high equipment maintenance costs associated with the ultrafiltration unit.

There remains the need to develop a process that can treat and recycle used flush solution generated in large automotive plants. The process should include removal of paint particles and a relatively high recovery of flush solution, preferably at minimal cost and with high through-put efficiency.

SUMMARY OF THE INVENTION

The invention is directed to a process for removing solids from a water-based flush solution comprising: providing dirty flush solution; directing the dirty flush solution to a treatment vessel; adding one or more chemicals to the treatment vessel to form a treated flush solution; separating aggregated paint compounds from the treated flush solution to form a filtered flush solution; and directing the filtered flush solution to spray application equipment.

The invention is also directed to a flush system for removing paint compounds from a dirty flush solution comprising: a treatment vessel, wherein the dirty flush solution is mixed with one or more chemicals to form a treated flush solution; a primary separation unit to remove particles including aggregated paint compounds from the treated flush solution to form a filtered flush solution; and transfer lines to direct the filtered flush solution to spray application equipment.

The invention is also directed to a filtered flush solution comprising: 1% to 5% by weight of a water soluble organic solvent; 0.08% to 2% by weight of an alkaline agent selected from an amine or an alkanolamine; 0.2% to 1.5% by weight of polypropylene glycol; 0.3% to 2.5% by weight of alkoxyethanol; and water.

BRIEF DESCRIPTION OF THE DRAWINGS

This invention will be better understood by reference to the Detailed Description of the Invention and consideration of the attached drawings, wherein.

DETAILED DESCRIPTION OF THE INVENTION

This invention is directed to a process of treating used water-based flush solution containing paint particles by mixing the used flush solution with a coagulant, flocculent, or mixture thereof to increase the effective size of the paint particles. The large paint particles (agglomerates) are then separated, relatively easily, from the water and water-soluble solvents in the treated flush solution. The process of the invention can also provide a means through which organic solvents commonly present in flush solutions and waterborne paints can be reclaimed and used in a recycled flush solution.

Figure 1:
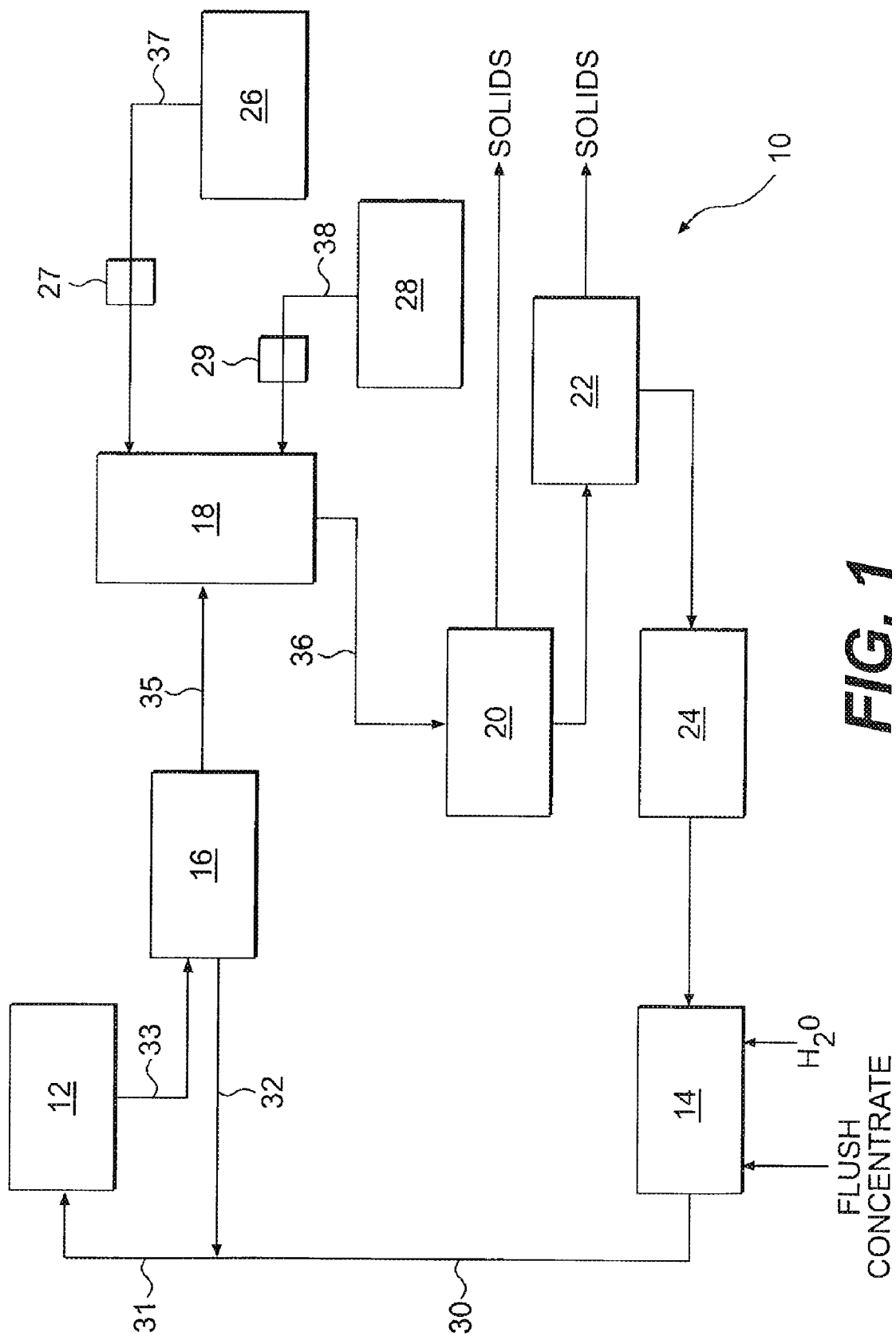
FIG. 1 is a schematic representation of one embodiment of a flush system of the invention.
Figure 2:
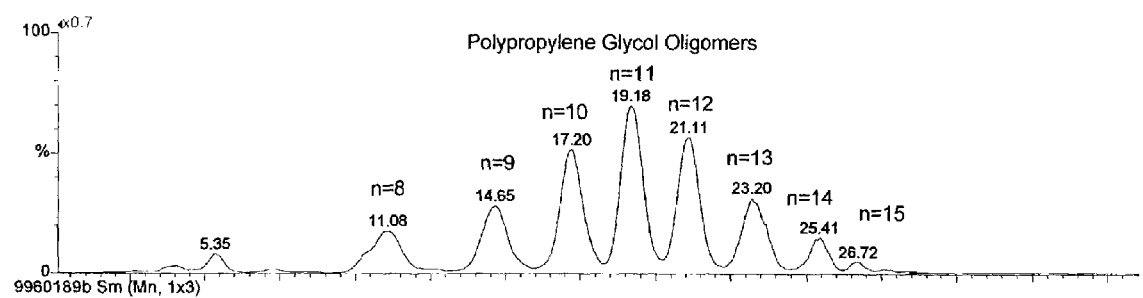
FIG. 2 is a LC-MS chromatogram of the polypropylene glycol in one embodiment of filtered flush solution of the invention.
Figure 3:
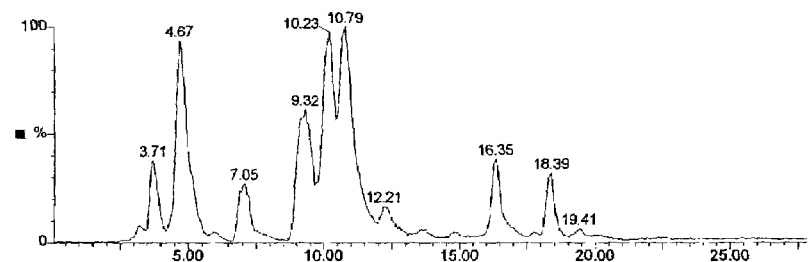
FIG. 3 is a LC-MS chromatogram of the oligomeric paint compounds in one embodiment of filtered flush solution of the invention.

FIG. 1 illustrates one embodiment of a flush system of the invention. The flush system 10 is used to clean paint lines, spray heads, spray booths, and other paint contacted surfaces in spray application equipment, shown collectively as 12. The flush solution can be circulated through the spray application equipment 12 in a multi-pass process, or pass through the spray application equipment 12 in a single pass, until the contact surfaces are sufficiently clean. The spray application equipment can then be used again with the same paint, a different color paint, or a different paint altogether. The flush system 10 includes a flush solution storage tank 14, a collection vessel 16, a treatment vessel 18, and a primary separation unit 20.

The flush solution storage tank 14 contains flush solution that is to clean spray application equipment 12. The flush solution is directed to the spray application equipment via lines 30 and 31. Line 31 can contain a mixture of flush solution from the flush solution storage tank 14, and if a multi-pass process is used, dirty flush solution from collection vessel 16, via line 32. If a single pass-through process is used, dirty flush solution is prevented from flowing through line 32.

Flush solution having passed through spray equipment 12 is collected in collection vessel 16 via line 33. Collection vessel 16 functions as a storage vessel for dirty flush solution. Some or all of the dirty flush solution is directed to treatment vessel 18 via line 35.

The term "dirty flush solution" is used to describe flush solution containing non-coagulated paint particles that has passed through the spray application equipment prior to any subsequent treatment to remove paint compounds. As shown in FIG. 1, dirty flush solution is restricted to lines 31, 32, 33 and 35.

Dirty flush solution is treated in treatment vessel 18. The treatment includes the addition of one or more chemicals to facilitate removal of paint compounds from the dirty flush solution. Treatment vessel 18 can include agitating members, e.g. a stirring device to mix the dirty flush solution with the one or more chemicals used, to increase the efficiency of the treatment process.

The term "treated flush solution" is used herein to describe dirty flush solution that has come in contact with one or more chemicals to facilitate removal of paint particles. Coagulated paint particles are present in treated flush solution. In FIG. 1, treated flush solution is confined to treatment vessel 18 and transfer line 36. Transfer line 36 directs treated flush solution to the primary separation unit 20.

The chemicals used to facilitate removal of paint compounds are selected from coagulants and/or flocculents. Coagulants and flocculents cause paint compounds to aggregate, hence, small paint particles become large paint particles. One or more chemicals can be used in the process of the invention that causes water-based polymer resins to aggregate. Aggregation increases the particle size of the paint compounds, which is necessary to achieve the advantages of the invention, that is, to provide an efficient process of removing paint compounds from dirty flush solution.

The term "particle" is not restricted to a solid particle per se, but also includes polymeric compounds with an effective spherical dimension, commonly found in paints. These polymers, as-like solid particles, can be removed from solution using a separation unit with an appropriate pore size.

The coagulant and flocculent chemicals used in the process of the invention include chemicals commonly used in the automotive industry and other industries for treating wastewater. Essentially, any chemical additive that can increase the particle size of paint particles can be used in the process of the invention.

Coagulants typically fall into the general category of inorganic (trivalent, divalent metal salts) or organic (water-soluble polyelectrolytes). Examples of widely used inorganic coagulants are aluminum and iron salts, e.g., aluminum sulfate, aluminum hydroxide, aluminum chloride, aluminum chlorohydrate, aluminum formate, ferric chloride, and ferric sulfate. Other inorganic salts can be used as well such as a mineral acid, magnesium oxide, and calcium chloride. It is to be understood, that the provided list is only a sampling of the many commercially available coagulants chemicals that can be used, and does not limit the invention to those recited.

Examples of commonly used organic coagulants are water-soluble or solution polyelectrolytes selected from polydimethyl diallyl ammonium chloride, polyamine epichlorohydrin-dimethylamine), and melamine formaldehyde resin colloids. It is to be understood, that the provided list is only a sampling of the many commercially available flocculent chemicals that can be used, and does not limit the invention to those recited.

Flocculants can include non-ionic cationic and anionic polymers. Generally, a flocculent will have a molecular weight greater than $10^6$ and a % mole charge greater than 1% by weight. Suitable flocculating agents are well known to those of ordinary skill in the art, and include, for example, P3 Croni 2405 (Henkel Corporation), and MAGNIFLOC 905N and 1906N (American Cyanamid, Wayne, N.J.

Many inorganic coagulants are compatible with solution cationic polyelectrolytes and can be combined to form a more effective coagulant. In recent years, many different blend formulations of an inorganic coagulant with a high charge solution cationic polyelectrolyte have become commercially available. One example of an inorganic coagulant/polymer blend might be: 5 parts of a standard 280 Baume $AlCl_3$ solution mixed with 1 part of Epi-DMA polyamine.

U.S. Pat. No. 5,547,587, the entire disclosure of which is incorporated herein by reference, lists a number of coagulants and flocculants that can be used in the present invention.

The amount of coagulant/flocculent added to the treatment vessel depends upon the concentration of paint in the used flush solution. As shown in FIG. 1, the coagulant/flocculent can be stored in tank 26, and added to treatment vessel 18, via line 37 and metering valve 27. The amount of coagulant/flocculent added to the treatment vessel is from 0.1% to 5% by volume, more preferably, 0.5% to 3% by volume relative to the total volume of dirty flush solution to be treated.

The system 10 can optionally include a secondary separation unit 22, and a clean collection vessel 24. All of these units can be integrally connected as shown in FIG. 1. For example, the secondary separation unit can be a second microfiltration unit, or a centrifugal, filtration unit that can reduce the total volume of solid sludge produced and thus reduce solid disposal costs.

In some instances, the secondary separation vessel 22 can be an ultrafiltration unit. In this case, because nearly all of the relatively large paint particles have already been separated out by primary separation unit 20, the efficiency of the ultrafiltration unit is increased. Also, the maintenance costs of operating the ultrafiltration unit are significantly reduced because there is less clogging of the membrane. Typically, an ultrafiltration unit is used in the process of the invention to remove non-desirable, water-soluble, non-volatiles from the filtered flush solution if necessary. The term "filtered flush solution" is used to describe treated flush solution that has passed through a separation unit.

In most cases, it will be advantageous to maintain water-soluble, non-volatile, organic polymers (solvents), i.e., those polymers originally present in the paint, in the filtered flush solution. This can provide an additional cost saving by reducing the amount of fresh flush solution that needs to be added to the flush system. The organic paint solvents and their accumulation in the used flush solution can provide an important component(s) to the flush solution. These compounds can at times function as the water-soluble solvents typically found in commercial flush solutions. As a result, only an alkaline source can be added to the flush system instead of fresh flush solution.

As shown in FIG. 1, the alkaline source is stored in tank 28, and added to treatment vessel 18, via line 38 and metering valve 29. Alternatively, the alkaline source can be added at any point in the flush system such as recycle collection tank 24 or purge storage tank 14.

There can be an advantage of adding the alkaline source to the treatment vessel 18. An increase in the pH of dirty flush solution prior to or during chemical treatment can increase the effectiveness of the coagulants and flocculants because most coagulants used for coagulating water based paints work by precipitating out of solution at slightly alkaline pH. Also, because the coagulants and flocculants used in the process are slightly acidic, the pH of the treated flush solution needs to be increased to a pH of about 8 or greater, if the treated flush solution is to be effective in removing residual paint. The alkaline source used to adjust the pH can be same or different alkaline source used in the fresh flush solution.

Although fresh flush solution or flush concentrate can be added to the flush solution supply tank to make-up for the flush solution not recovered, the process of the invention can be operated without the addition of fresh flush solution. If fresh flush solution is not added, the addition of alkaline agent such as an amine or alkanolamine, as described above, is added to readjust the pH of the flush solution.

One advantage of the process of the invention is the use of relatively simple and inexpensive separation units for removing relatively large coagulated or flocculated paint particles from treated flush solution. Primary separation units that could be used in the process of the invention used include a centrifugal separation unit, filter press unit, and microfiltration unit. Microfiltration is defined as a technique for removing particles with an effective size from 1 micron to 100 microns.

The coagulated or flocculated paint particles formed in the process generally will have a particle size greater than 20 microns. Particles of this size can easily be separated, as demonstrated in the examples, using a Whatman #4 filter paper (Whatman#4 pore size is 20 to 25 microns). For example, paint particles of 0.1 microns and less can increase in size to greater than 100 microns following treatment with a coagulant or flocculent. By increasing the particle size of the suspended water-based paint particles, water and water-based solvents can be separated in about half the time or less compared to a process that relies upon ultrafiltration.

Ultrafiltration units have membranes with a pore size ranging from 0.005 microns to 0.1 microns. The small pore size of the membrane severely hinders the permeation rate of dirty flush solution through the membrane, which causes significant delays in processing. Although the introduction of a large number of ultrafiltration units in parallel can compensate for the slow permeation rate, the capital equipment costs and maintenance costs make such a process prohibitively expensive.

In one embodiment of the invention, a series of bag type filters with pore sizes from 200 microns to 0.1 microns can be used to remove coagulated paint particles from treated flush solution. For example, following chemical treatment of a dirty flush solution in a treatment vessel, treated flush solution can be processed by a series of 100 micron bag filters. The filtered liquid is then passed through a 1 micron bag filter to remove any residual dirt or paint before entering back into the purge supply tank. Alternatively, treated flush solution can be processed by a series of micron bags with decreasing pore size.

In another embodiment, the primary and the secondary separation units can include a series of cartridge filter units with the primary separation unit having relatively larger pore openings than the secondary separation unit.

The water and solvent recovery efficiency for the process of the invention is greater than about 35% by volume of the total amount of fresh flush solution used to initially charge the flush system plus, if any, fresh flush solution that is subsequently added to the system. In many instances, the process can operate at recovery rates of water and solvent greater than 70% depending on the separation unit used. For example, microfiltration of the coagulated/flocculated paint particles using a 20 micron pore size filter can result in greater than 70% recovery efficiency. The resulting solids are characterized as a damp, non-tacky solid sludge.

The process of the invention provides a filtered flush solution composition that contains components originally present in fresh flush solution and components originally present in paints. These paint components are water-soluble solvents selected from butyl cellosolve (butoxyethanol), hexyl cellosolve (heloxyethanol), polypropylene glycol, and any combination thereof.

The paint components in the filtered flush solution can also include a mixture of relatively low molecular oligomers or resins. The molecular weight of these oligomeric components range from about 50 to about 1000.

A filtered flush solution of the invention comprises: 1% to 5% by weight of a water soluble organic solvent; 0.08% to 2% by weight of an alkaline agent selected from and an amine or an alkanolamine; 0.2% to 1.5% by weight of polypropylene glycol; 0.3% to 2.5% by weight of alkoxyethanol; and water. The filtered flush solution can also include 0.2% to 2% by weight of relatively low molecular weight oligomeric paint components.

The alkaline agent in the filtered flush solution is preferably an alkanolamine selected from monoisopropanol amine, a primary amine alkoxylate or any mixture thereof. In one embodiment the filtered flush solution will contain from 0.1% to 0.6% by weight of an alkaline agent. The primary amine alkoxylate is of formula $H_2N(CH_2CH_2O)_nH$ or $H_2N(CH_2CH(CH_3)O)_nH$, wherein n is 1 to 10, preferably n is 2 to 4. A mixture of any two primary amine alkoxylates can also be used. Increasing the alkoxylate level, e.g., from n=1 to n=2, of the primary amine alkoxylate can reduce the level of volatile organic compounds (VOCs) in the flush compositions without appreciably effecting the performance of the flush solution.

The polypropylene glycol in the filtered flush solution will have a number average ($N_{avg}$) from 8 to 14, preferably from 10 to 12. The $N_{avg}$ describes in part the average number molecular weight of the polypropylene glycol. For example, the polypropylene glycol will comprise a mixture of polypropylene glycols with different n-values with formula, $HO\text{---}[CH_2CH_2CH_2O]_n\text{---}H$. A hypothetical mixture with 5 molecules with n=9, 10 molecules with n=10, 15 molecules with n=11, 10 molecules with n=12, and 5 molecules with n=13 will have a $N_{avg}$ of 11.

The oligomeric component present in filtered flush solution can be identified by a retention time in a gas chromatogram relative to the polypropylene glycol in the filtered flush solution. The majority of the oligomeric components should elute from a ZB-5 gc column 30 meter in length (0.25 mm ID×0.25 μm) under common operating temperatures before the majority of polypropylene glycol components.

The amount of alkoxyethanol relative to the amount polypropylene glycol by weight in the filtered flush solution can be defined by a weight ratio of alkoxyethanol:polypropylene glycol. The weight ratio of alkoxyethanol:polypropylene is from 4:1 to 1:2, preferably from 3:1 to 1:1.

Alternatively, the amount of oligomeric components relative to the amount polypropylene glycol by weight in the filtered flush solution can be defined by a weight ratio of oligomeric components:polypropylene glycol. The weight ratio of oligomeric components:polypropylene glycol is from 2:1 to 1:2.

Alternatively, the amount of alkoxyethanol relative to the amount alkaline agent by weight in the filtered flush solution can be defined by a weight ratio of alkoxyethanol:alkaline agent. The weight ratio of oligomeric alkoxyethanol:alkaline agent is from 10:1 to 2:1.

Paint can be removed from a paint covered surface by contacting the surface with filtered flush solution of the invention, or with a flush solution containing a mixture of fresh flush solution and filtered flush solution. Although the methods of contacting the surface with the flush solution can be accomplished in a number of ways, immersion and spraying are the most preferred methods. If the surface to be cleaned is readily accessible, then spraying is generally preferred. The mechanical force of the impinging flush solution facilitates removal of the paint. On the other hand, if the surface to be cleaned has recesses or other shapes that are not readily accessible, immersion will generally be preferred. Of course, both methods can be used in combination and/or varied in ways apparent to those skilled in the art. Optimal dilution ratios and temperature of the flush solution depends on the method of contact. It is to be understood however, that those skilled in the art can determine optimal conditions by minimal experimentation.

Flush solutions are typically heated to a temperature of from about 30° C. to about 60° C. and then circulated through spray application equipment to remove any residual paint from the equipment. However, in practice, the temperature of the circulating flush solution is often lower than the temperature of the flush solution in the flush solution storage tank due to the consequent heat loss during circulation. Prior to and/or after circulation of the flush solution, the equipment may be subjected to other cleaning methods such as flushing with water or with a gas such as air or nitrogen.

The contact time needed to effect a substantial removal of paint from a surface will depend on the nature and thickness of the paint, the composition of the flush solution including the dilution factor, the temperature of the solution, and other factors. With some paints and under some conditions, contact times of a few minutes (e.g., 2-3 minutes) may be sufficient. In some instances, the contact times can be 1 hour or more.

If the flush solution is sprayed onto a surface, the praying pressure will usually range from 1.3 bars to 8.0 bars absolute pressure. The temperature of the flush solution will usually range from 15° C. to 60° C. Higher temperatures and pressures generally increase the rate at which the paint is removed from the surface.

Fresh flush solutions used in the process of the invention contain one or more alkaline sources and one or more water-soluble solvents. Also, additives can be added that enhance the performance of the flush solution. One flush solution that can be used in the invention is described in U.S. patent application Ser. No. 10/183,662 filed Jun. 25, 2002, the entire disclosure of which is incorporated herein by reference. Another flush solution that can be used is described in U.S. patent application Ser. No. 10/027,445 filed Dec. 20, 2001, the entire disclosure of which is incorporated herein by reference. Of course, commercially available flush solutions can be used as well.

Flush solutions are useful for removing paint residues from automated and manual equipment such as paint sprayers and paint dip installations. Fresh flush solutions are typically prepared from flush solution concentrate diluted with water. To prepare a diluted, fresh flush solution, the end-user dilutes a concentrate flush solution to about 2% to about 50% by volume with water. In other embodiments, concentrate flush solution is diluted to about 2% to about 20% by volume, preferably to about 2% to about 10% by volume, by the addition of water.

The alkaline source is either an amine or alkanolamine. Alkanolamines that can be used in flush solutions include monoethanolamine (MEA), dimethylethanolamine (DMEA), monoisopropanolamine (MIPA), diethanolamine (DEA), and mixtures of primary and secondary alkanolamines.

Water-soluble solvents that can be used in flush solutions include lower alcohols and glycol ethers such as ethylene glycol n-butyl ether, diethylene glycol n-butyl ether, triethylene glycol methyl ether, propylene glycol n-butyl ether, dipropylene glycol methyl ether, propylene glycol methyl ether, and propylene glycol n-propyl ether. Unfortunately, there is not a single flush solution that can be used or is ideal for all types of coatings. Different proportions and combinations of amines/alkanolamines and solvents need to be determined for various types of coatings.

One preferred water-soluble solvent that can be used in flush solution is an aromatic ethoxylate solvent. The aromatic ethoxylate solvent contains one or more compounds with an aromatic ring, e.g., a phenyl ring, substituted on at least one position with an aliphatic group containing two or more ethoxylate units. The end ethoxylate unit can be end-capped with a hydrogen, $C_1$-$C_6$ alkyl or phenyl. The aromatic ring can also contain one or more alkyl substituents with one to four carbons. Examples of some alkyl substituents include methyl, ethyl, propyl, and isopropyl.

In one embodiment, the ethoxylate solvent composition contains one or more compounds with an aromatic ring and ethoxylate units of general formula I

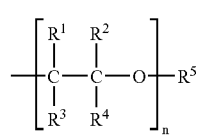

wherein: $R^1$, $R^2$, $R^3$ and $R^4$ are independently selected from hydrogen and methyl; $R^5$ is hydrogen, a $C_1$-$C_6$ alkyl, or phenyl; and n is 2, 3, 4, 5 or 6. The ethoxylate unit of formula I is attached to the aromatic ring directly or through an ether (oxygen) linkage or an oxymethylene (—$CHR^8O$—) linkage, wherein $R^8$ is hydrogen or $C_1$-$C_4$ alkyl.

One type of an ethoxylate solvent composition contains one or more ethoxylated compounds of general formula II with a number average (Navg.) of ethoxylate units from about 3 to about 8, wherein $R^1$, $R^2$, $R^3$, $R^4$ and $R^5$ are as defined in formula I, and $R^6$, $R^7$ and $R^8$ are independently selected from hydrogen and $C_1$-$C_4$ alkyl. Preferably, the substituents $R^1$, $R^2$, $R^3$ and $R^4$ combine to be at least 60 atom %, more preferably at least 80 atom %, hydrogen. Also, it is preferred that if Navg. is less than four, then $R^5$ is hydrogen.

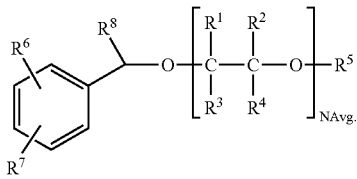

For example, Genapol® BA 04 is a mixture of ethoxylated benzyl alcohols of general formula II that contain from one to about 10 ethoxylate units. A small weight percentage of the solvent composition can also contain compounds with more than 10 ethoxyylate units. The manufacturer reports that Genapol® BA 04 has a number average (Navg.) of ethoxyl ate units of about 38.

Other solvent compositions that can be used in the flushing solutions of the invention include one or more of alkoxylated aromatic alcohols. Also, any one or more of these aromatic alcohols can be used in combination with solvent compositions of general formula I or II. A list of the aromatic alcohols that can be used include triethylene glycol monophenyl ether, tetraethylene glycol monophenyl ether, pentaethylene glycol monophenyl ether, hexaethylene glycol monophenyl ether, heptaethylene glycol monophenyl ether, trietylene glycol monobenzyl ether, tetraethylene glycol monobenzyl ether, pentaethylene glycol monobenzyl ether, hexaethylene glycol monobenzyl ether, heptaethylene glycol monobenzyl ether, water-soluble ethoxylates of propylene glycol monophenyl ether (preferably, containing an average of at least 2 oxyethylene moieties per molecule), and the like and mixtures thereof.

The invention and its benefits will be better understood with reference to the following examples. These examples are intended to illustrate specific embodiments within the overall scope of the invention as claimed, and are not to be understood as limiting the invention in any way.

EXAMPLE 1

Simulated used flush solutions are prepared by mixing fresh flush solution with a water-based paint mixture. Compositions of the simulated test solutions are summarized in Table 1. This test solutions simulate a used flush solution of 10% by volume Parcosol 277WB and 5% by volume of a water-based paint in deionized water. Parcosol 277WB, available from Henkel Surface Technologies, is a very low VOC (volatile organic compound) based flushing solution, which contains 2.4% wt. of non-volatile activator solvents. A flocculent, P3 Croni 2405, also available from Henkel Surface Technologies, is added to the test solutions, and the mixture stirred for 3 minutes. The coagulated and flocculated solution mixture is gravity filtered using Whatman #4 filter paper (Whatman #4 has a pore size of 20 to 25 microns).

The resultant supernatant or filtered test solution is analyzed for % non-volatile components following the EPA 24 Method for % Non Volatiles (0.5 grams of sample plus 0.5 grams of water heated at 105° C. for 1 hour). The results are compared to the % non-volatiles in Parcosol 277WB at 10% by volume. The higher non-volatiles in the filtered test solutions are due to water soluble non-volatiles from the water-based paint systems. These non-volatiles are believed to be surfactants and non-volatile solvents used in paints.

TABLE 1

Test Solution Compositions.

| Test Solution | water mL | Parcosol 277WB mL | Water-based Paint | P3 Croni 2405 mL | Average % Solids |
|---|---|---|---|---|---|
| 1 | 855 | 95 | 50 ml of PPG Silver Waterborne Basecoat | 15 | 2.85 |
| 2 | 855 | 95 | 50 ml of DuPont Silver Waterborne Basecoat | 20 | 2.85 |
| 3 | 855 | 95 | 50 ml of BASF Silver Waterborne Basecoat | 17 | 2.72 |

EXAMPLE 2

Simulated 20% by Volume Paint and Flushing Solution Mixture 1200 ml of a 10% by volume Parcosol 277WB in water and 300 ml of DuPont Silver waterborne basecoat are mixed in a beaker. P3 Croni 2405 is added until the waterborne paint has completely coagulated out of solution. The pH of the solution is adjusted to a pH of 8.9 by adding 6.0 grams of monoisopropanolamine. The total volume of test solution in the beaker is equal to 1550 ml. Under a slight vacuum, the solution is filtered using a filter fitted with Whatman #4 filter paper. The volume of water recovered, volume of sludge, and % non-volatiles for the sludge and filtered water are determined.

1080 mL of filtrate is recovered resulting in a liquid recovery of 70%. The total volume of sludge collected is 550 ml. The % non-volatiles in the sludge is 25.74% wt. The % non-volatiles for the filtered liquid is 3.38% wt. Comparing the % non-volatiles of the filtrate to a control of Parcosol 277WB at 10% shows an increase in the % non-volatiles of about 1% by weight. This % non-volatile increase is due to the water-soluble non-volatile surfactants and solvents collected from the water-based paints.

EXAMPLE 3

Filtered flush solutions are prepared by mixing DuPont waterborne paint and Parcosol 277WB solution followed by chemical treatment with P3 Croni 2405 and filtration as described in Example 2. The filtered flush solutions are then evaluated for cleaning performance using the Dry Film Removal Test Method 948-020. The filtered flush solution is tested with and without the addition of 3% wt. monoisopropanolamine. The performance is also compared to a control solution of 10% by volume Parcosol 277WB diluted with deionized water.

Waterborne Dry Film Removal Test Method.

DuPont Smoke, Taupe and White waterborne primer paints are used for the performance testing. Using a #40 drawdown bar, a 4.0 mil film of waterborne paint is cast down onto a glass panel and baked at 120 F for 0.5 hours. A conventional spray gun having a 0.042 inch fluid tip size is positioned 4 inches away from the glass panel. Using a fluid pressure of 5 psig and 25 psig, a solid stream of liquid is directed onto the coated glass panel. The times required to clean a 10.4 mm diameter circle of paint from the glass panel are provided in Tables 2-4. The solutions were evaluated at 120 F.

TABLE 2

Filtered Flush Solution.

| Paint | 5 psig sec. | 25 psig sec. |
|---|---|---|
| Dupont White | 1.08 | 0.78 |
| Dupont Taupe | 1.24 | 0.84 |
| Dupont Smoke | 1.42 | 1.09 |

TABLE 3

Filtered Flush Solution with 3% by volume addition of MIPA.

| Paint | 5 psig sec. | 25 psig sec. |
|---|---|---|
| Dupont White | 1.34 | 0.98 |
| Dupont Taupe | 1.55 | 0.86 |
| Dupont Smoke | 1.75 | 1.13 |

TABLE 4

Control Flush Solution with Parcosol 277WB.

| Paint | 5 psig sec. | 25 psig sec. |
|---|---|---|
| Dupont White | 1.14 | 0.76 |
| Dupont Taupe | 1.02 | 0.70 |
| Dupont Smoke | 1.02 | 0.69 |

EXAMPLE 4

The oligomeric mixture in filtered flush solution from Example 2 is identified by a series of peaks using GC-MS and LC-MS. The respective amounts of butyl cellosolve and hexyl cellosolve in the filtered flush solution were determined by GC-MS using a standard curve. The amount of monoisopropanolamine was determined by comparison with a standardized curve (areas) of known concentrations.

LC-MS:

The Genapol BA-040 percentage was determined by comparing the peak areas of a known concentration obtained from Parcosol 277. In a comparative analysis, the peak area of Parcosol 277 compared with filtered flush solution indicates that about 25% of the Parcosol is not recovered or not present in the filtered flush solution. As a result, it is estimated that about 2.03% absolute of the total collected percent solids collected is the Genapol BA-040 from the original flush solution. The total collected percent solids in the filtered flush solution is 3.33%. Therefore, the remaining 1.3% of the total collected percent solids is accounted for by polypropylene glycol and polymeric material originally present in the paint.

The polypropylene glycol (PPG) and polymeric material peak areas were obtained by what is referred to as ion extraction. Because the mass to charge ions. i.e., the peaks, with respect to the PPG and polymeric material are known, the peaks associated with PPG and the polymeric material can be selected out of the total LC-MS chromatogram to provide peak areas solely for PPG and the polymeric material.

The total area divided into each material area gives a relative percentage. The area of PPG/total area (PPG & polymer)=52%. The area of polymer material/total area (PPG& polymer)=48%.

Gravimetric (Percent Solids):

Percent solids is determined by drying the sample at 110° C. to drive off all of the volatile solvents, and leaving only the higher molecular weight material. The total percent of solids in the filtered flush solution is 3.33%. As a result, the amount of PPG solids and polymeric material in the filtered flush solution is provided by equation (1).

$$3.33\% - 2.03\% \text{ (Genapol BA-040)} = 1.3\% * 52\% = 0.676 = 0.68\% \text{ PPG} \quad (1)$$

$$1.3\% * 48\% = 0.624 = 0.62\% \text{ polymeric material} \quad (2)$$

The contents of the filtered flush solution from Example 2 is summarized in Table 5.

TABLE 5

| Analytical Method | Solution Component | Percent in filtered flush solution |
|---|---|---|
| LC-MS | Genapol BA-04 | 2.03 |
| GC-MS | monoisopropanolamine | 0.23 |
| LC-MS gravimetric | PPG | 0.68 |
| GC-MS | butyl cellusolve | 1.14 |
| GC-MS | hexyl cellusolve | 0.06 |
| LC-MS gravimetric | polymeric material | 0.62 |

The gas chromatogram is operated under the conditions stated below.

Flow rate is 1.0 mL/min with a split of 30:1 and helium as carrier gas. The injector temperature is set at 275° C., and the column is a ZB-530 meter (0.25 mm ID×0.25 μm). The oven temperature is programmed as follows:

| Time | Hold time min. | Temp. ° C. | Rate ° C./min |
|---|---|---|---|
| T0 |   | 40 |   |
| T1 | 1 | 40 | 5 |
| T2 | 10 | 170 | 22.9 |
| T3 | 10 | 250 | 20 |
| T4 | 10 | 340 |   |

The liquid chromatogram is operated under the conditions stated below.

Liquid Chromatograph Method:

Flow rate=0.70 mL/min; Split 1:10 to ESI (ESI Flow 0.07 mL/min); Mobile Phase A=Water (5 mM Ammonium Acetate); Mobile Phase B=Methanol (5 mM Ammonium Acetate); Column Temperature: 35° C.; Column: Phenomenex Max-RP 5 m 150×4.6 mm; Guard Column: Phenomenex Max-RP 5 m cartridge

| Time (min) | Flow | % A | % B |
|---|---|---|---|
|   | 0.70 | 40.0 | 60.0 |
| 1.00 | 0.70 | 40.0 | 60.0 |
| 10.0 | 0.70 | 20.0 | 80.0 |
| 15.0 | 0.70 | 20.0 | 80.0 |
| 21.0 | 0.70 | 0.0 | 100.0 |
| 36.0 | 0.70 | 0.0 | 100.0 |
| 37.0 | 0.70 | 40.0 | 60.0 |
| 47.0 | 0.70 | 40.0 | 60.0 |

What is claimed is:

1. A process for removing solids from a water-based flush solution comprising:
   providing dirty flush solution, wherein the dirty flush solution contains from 5% to 20% by volume paint;
   directing the dirty flush solution to a treatment vessel;
   adding one or more chemicals to the treatment vessel to form a treated flush solution, wherein the one or more chemicals includes a flocculent or a coagulant to facilitate removal of paint compounds by forming aggregated paint compounds that have a particle size of at least 20 microns;
   separating aggregated paint compounds from the treated flush solution to form a filtered flush solution; and
   directing the filtered flush solution to spray application equipment.

2. The process of claim 1 further comprising directing a portion of the dirty flush solution to spray application equipment.

3. The process of claim 1 further comprising adding one or more chemicals to the treatment vessel to adjust the pH of the treated flush solution, and monitoring the pH of the treated flush solution.

4. The process of claim 3 wherein the one or more chemicals added to adjust the pH is an amine or an alkanolamine.

5. The process of claim 1 wherein separating aggregated paint compounds comprises directing the treated flush solution to a primary separation unit to remove the aggregated paint compounds.

6. The process of claim 5 further comprising directing a filtrate from the primary separation unit to a secondary separation unit to remove additional paint compounds.

7. The process of claim 6 wherein the secondary separation unit is an ultrafiltration unit or a microfiltration unit.

8. The process of claim 6 wherein the primary and the secondary separation units are cartridge filter units, and the primary separation unit has larger pore openings than the secondary separation unit.

9. The process of claim 5 wherein the primary separation unit is selected from the group consisting of a filter press, centrifuge, and microfiltration unit.

10. The process of claim 1 further comprising directing fresh flush solution to the spray application equipment.

11. The process of claim 1 wherein directing the filtered flush solution includes combining the filtered flush solution with fresh flush solution in a flush solution storage tank.

12. The process of claim 1 wherein the one or more chemicals added to the treatment vessel is an inorganic compound selected from the group consisting of magnesium oxide, aluminum sulfate, a mineral acid, aluminum hydroxide, aluminum chloride, aluminum chlorohydrate, aluminum formate, ferric chloride, ferric sulfate, and calcium chloride.

13. The process of claim 1 wherein the one or more chemicals added to the treatment vessel is an organic compound selected from the group consisting of polydimethyl diallyl aluminum chloride, polyamine epichlorohydrin-dimethylamine, and melamine formaldehyde resin colloids.

14. The process of claim 1 wherein the flocculent or a coagulant added to the treatment vessel is from 0.1% to 5% by volume relative to the total volume of dirty flush solution to be trend.

15. The process of claim 1 wherein the forming of the filtered flush solution provides greater than a 70% recovery of water and solvent from the dirty flush solution.

16. The process of claim 1 wherein a total amount of the flocculent or the coagulant added to the flush solution is defined by a volume ratio of flocculent and coagulant to paint from 1:33 to 2:25.

17. The process of claim 1 wherein the filtered flush solution is 59% to 95% as effective in removing paint from the spray application equipment as fresh flush solution.

* * * * *